(12) United States Patent
Vestberg et al.

(10) Patent No.: US 12,344,683 B2
(45) Date of Patent: Jul. 1, 2025

(54) PROCESS FOR PRODUCING A PREPOLYMERIZED SOLID ZIEGLER-NATTA CATALYST

(71) Applicant: BOREALIS AG, Vienna (AT)

(72) Inventors: Torvald Vestberg, Porvoo (FI); Markku Vahteri, Porvoo (FI); Anna Fait, Linz (AT); Pauli Leskinen, Porvoo (FI); Jingbo Wang, Linz (AT)

(73) Assignee: BOREALIS AG, Vienna (AT)

( * ) Notice: Subject to any disclaimer, the term of this patent is extended or adjusted under 35 U.S.C. 154(b) by 868 days.

(21) Appl. No.: 17/273,260

(22) PCT Filed: Sep. 20, 2019

(86) PCT No.: PCT/EP2019/075393
§ 371 (c)(1),
(2) Date: Mar. 3, 2021

(87) PCT Pub. No.: WO2020/064568
PCT Pub. Date: Apr. 2, 2020

(65) Prior Publication Data
US 2021/0317242 A1    Oct. 14, 2021

(30) Foreign Application Priority Data
Sep. 28, 2018   (EP) .................................. 18197546

(51) Int. Cl.
*C08F 110/06* (2006.01)
*C08L 23/12* (2006.01)

(52) U.S. Cl.
CPC ............. *C08F 110/06* (2013.01); *C08L 23/12* (2013.01); *C08F 2410/06* (2021.01); *C08F 2500/18* (2013.01); *C08L 2205/025* (2013.01)

(58) Field of Classification Search
CPC .... C08L 23/12; C08F 2410/06; C08F 210/06; C08F 2/001
See application file for complete search history.

(56) References Cited

U.S. PATENT DOCUMENTS

| | | | |
|---|---|---|---|
| 4,107,414 A | 8/1978 | Giannini et al. | |
| 4,186,107 A | 1/1980 | Wagner | |
| 1,226,963 A | 10/1980 | Giannini et al. | |
| 4,347,160 A | 8/1982 | Epstein et al. | |
| 4,382,019 A | 5/1983 | Greco | |
| 4,435,550 A | 3/1984 | Ueno et al. | |
| 4,465,782 A | 8/1984 | McKenzie | |
| 4,472,524 A | 9/1984 | Albizzati | |
| 4,473,660 A | 9/1984 | Albizzati et al. | |
| 4,522,930 A | 6/1985 | Albizzati et al. | |
| 4,530,912 A | 7/1985 | Pullukat et al. | |
| 4,532,313 A | 7/1985 | Matlack | |
| 4,560,671 A | 12/1985 | Gross et al. | |
| 4,581,342 A | 4/1986 | Johnson et al. | |
| 4,657,882 A | 4/1987 | Karayannis et al. | |
| 4,721,763 A * | 1/1988 | Bailly ..................... | C08F 10/02 526/124.8 |
| 5,028,671 A | 7/1991 | Kioka et al. | |
| 6,468,936 B1 * | 10/2002 | Reddy ..................... | C08F 10/00 502/103 |
| 2001/0051697 A1 * | 12/2001 | Morse ..................... | C08F 10/00 526/904 |
| 2008/0182950 A1 * | 7/2008 | Lee ......................... | C08F 10/06 526/348 |
| 2013/0211011 A1 * | 8/2013 | Gaddi ..................... | C08L 23/14 525/240 |
| 2015/0322179 A1 * | 11/2015 | Galvan ................... | C08F 210/06 526/128 |
| 2017/0066912 A1 * | 3/2017 | Wang ..................... | C08L 23/16 |
| 2017/0121431 A1 * | 5/2017 | Vestberg ................ | C08F 110/06 |

FOREIGN PATENT DOCUMENTS

| | | |
|---|---|---|
| CN | 88101916 A | 10/1988 |
| DE | 69429198 T2 | 8/2002 |
| EP | 0045977 B2 | 1/1987 |
| EP | 0045976 B2 | 11/1989 |
| EP | 0641807 A2 | 3/1995 |
| EP | 2330139 A1 | 6/2011 |
| EP | 2415790 A1 | 2/2012 |
| EP | 02610270 A1 | 7/2013 |
| EP | 02610271 A1 | 7/2013 |
| EP | 02610272 A1 | 7/2013 |

(Continued)

OTHER PUBLICATIONS

Applicant: Borealis AG; European Patent Application No. 18197546.7; "Process for Producing a Prepolymerized Solid Ziegler.Natta Catalyst"; Extended European Search Report; Mar. 22, 2019; 6 pgs.

(Continued)

*Primary Examiner* — Michael M Dollinger
(74) *Attorney, Agent, or Firm* — Tarolli, Sundheim, Covell & Tummino LLP

(57) ABSTRACT

The present invention relates to a process for producing a prepolymerized solid Ziegler-Natta catalyst in batch mode, a prepolymerized solid Ziegler-Natta catalyst, a process for producing a propylene polymer using said prepolymerized solid Ziegler-Natta catalyst, a prepolymerized solid Ziegler-Natta catalyst obtained by a process as well as the use of the prepolymerized solid Ziegler-Natta catalyst in a process for producing a propylene polymer.

9 Claims, No Drawings

(56) References Cited

FOREIGN PATENT DOCUMENTS

| EP | 1538167 B1 | 11/2015 |
| JP | 2011195661 A | 10/2011 |
| WO | 1995/32994 | 12/1995 |
| WO | 2012/007430 | 1/2012 |
| WO | 2017/0148969 A1 | 9/2017 |

OTHER PUBLICATIONS

Applicant: Borealis AG; Chinese Patent Application No. 201980057554.6; "Process for Producing a Prepolymerized Solid Ziegler.Natta Catalyst"; Chinese Office Action dated Sep. 13, 2022; 26 pgs.

* cited by examiner

PROCESS FOR PRODUCING A PREPOLYMERIZED SOLID ZIEGLER-NATTA CATALYST

The present invention relates to a process for producing a prepolymerized solid Ziegler-Natta catalyst in batch mode, a prepolymerized solid Ziegler-Natta catalyst, a process for producing a propylene polymer using said prepolymerized solid Ziegler-Natta catalyst, a prepolymerized solid Ziegler-Natta catalyst obtained by the batch-mode prepolymerization process as well as the use of the prepolymerized solid Ziegler-Natta catalyst in a process for producing a propylene polymer.

Polypropylene is the material of choice in many applications such as in the field of films, packaging materials or automotives. However, in case a Ziegler-Natta catalyst is employed during the manufacturing of the polypropylene, the morphology of the polymer powder obtained is not usually ideal. In addition, there are problems in the bulk density in combination with high fine levels, which need attention to be solved. There has been attempts to improve the powder morphology with the common tools available at the production plant, like changing conditions or ratios of catalyst components during catalyst activation step, or during the process prepolymerization step, however additional efforts are still needed to improve the morphology. Further, there is a need to provide a catalyst having the desired performance in polymerization processes and being prepared without using any phthalic compounds, which are non-desired compounds in health, safety and environmental point of view.

Accordingly, the industries seek for a propylene polymers having improved powder morphology and thus to improve the plant throughput.

The finding of the present invention is that a prepolymerized solid Ziegler-Natta catalyst is to be provided in order to produce a propylene polymer having improved powder morphology.

Accordingly, the present invention is directed to a process for producing a prepolymerized solid Ziegler-Natta catalyst in batch mode, the process comprising the steps of:
a) providing a solid Ziegler-Natta catalyst component being free of phthalic compounds, wherein the solid Ziegler-Natta catalyst component comprises
  (a1) a compound of a transition metal (TM), which transition metal is selected from one of the groups 4 to 6 of the periodic table (IUPAC),
  (a2) a compound of a metal (M) which metal is selected from one of the groups 1 to 3 of the periodic table (IUPAC), and
  (a3) an internal donor (ID) being a non-phthalic compound, wherein the internal donor (ID) is selected from optionally substituted malonates, maleates, succinates, glutarates, citraconates and derivatives and/or mixtures thereof; and
b) subjecting the solid Ziegler-Natta catalyst component of step a) into a catalyst prepolymerization step, wherein the solid Ziegler-Natta catalyst component is prepolymerized in the presence of one or more olefin monomer(s) selected from C2, C3 or C4 olefin monomers and mixtures thereof to obtain the prepolymerized solid Ziegler-Natta catalyst.

It has surprisingly been found out that such a process results in a prepolymerized solid Ziegler-Natta catalyst which is suitable to produce propylene polymers having improved powder morphology.

It has to be distinguished a prepolymerisation step being part of the polymerization process, called in this application a process prepolymerization step from the catalyst prepolymerization step conducted in batch-mode. The process prepolymerization step is conducted in industrial scale polymerization continuously.

Prepolymerized (solid) catalyst, or off-line or batch-mode prepolymerized (solid) catalyst have the same meaning in this application.

According to another aspect of the present invention, a process for producing a propylene polymer is provided. The process comprises the steps of:
c) providing a solid prepolymerized solid Ziegler-Natta catalyst as defined herein,
d) subjecting the prepolymerized solid Ziegler-Natta catalyst of step c) into a polymerization reactor, where propylene and optionally at least one other α-olefin selected from C2 and/or C4 to C8 α-olefin is/are polymerized in the presence of the prepolymerized solid Ziegler-Natta catalyst,
e) obtaining a propylene polymer from step d) being free of phthalic compounds originating from the catalyst.

In one embodiment, step d) is carried out in one or more polymerization reactor(s) optionally comprising a process prepolymerization step.

According to still another aspect of the present invention, a prepolymerized solid Ziegler-Natta catalyst obtained by a process as defined herein is provided.

According to a further aspect of the present invention, the use of a prepolymerized solid Ziegler-Natta catalyst as defined herein in a process for producing a propylene polymer is provided.

In the following, the present invention is described in more detail.

The solid Ziegler-Natta catalyst component of step a) comprises (a1) a compound of a transition metal (TM), which transition metal is selected from one of the groups 4 to 6 of the periodic table (IUPAC), preferably a titanium compound, (a2) a compound of a metal (M) which metal is selected from one of the groups 1 to 3 of the periodic table (IUPAC), preferably a metal of group 2 of the periodic table (IUPAC), more preferably a magnesium compound, and (a3) an internal donor (ID) being a non-phthalic compound as defined above.

In another embodiment, the catalyst prepolymerization step b) is carried out in the presence of a co-catalyst and optionally in the presence of an external electron donor.

In yet another embodiment, the ratio of the external electron donor (ED) to the compound of a transition metal (TM) [ED:TM] is from 0 to 5 mol/mol, preferably from 0.5 to 3 mol/mol, and/or the ratio of the co-catalyst (Co) to the compound of a transition metal (TM) [Co:TM] is in the range from 0.5 to 10 mol/mol, preferably from 1 to 5 mol/mol.

The internal donor (ID) is selected from optionally substituted malonates, maleates, succinates, glutarates, citraconates and derivatives and mixtures thereof, preferably from substituted maleates and citraconates, most preferably the internal donor (ID) is a citraconate.

In another embodiment, the olefin monomer in step b) is selected from C2, C3 and linear C4 olefin monomers.

In yet another embodiment, step b) is carried out off-line in a medium, preferably the medium is an oil or a hydrocarbon solvent.

In one embodiment, the prepolymerization degree in step b) is from 0.2 to 50 gPO/g cat, preferably 0.4 to 30 gPO/g cat, more preferably 0.5 to 20 gPO/g cat, still more preferably 0.5 to 10 gPO/g cat.

In one embodiment, the prepolymerized solid Ziegler-Natta catalyst is free of an external support material, i.e. no external support material, like $MgCl_2$ or silica, is separately added to the catalyst synthesis.

Thus, the prepolymerized solid Ziegler-Natta catalyst is free of an external support material and free of any phthalic compounds, and has been prepolymerized in the presence of olefins selected from C2, C3 and linear C4 olefin monomers, and has a prepolymerization degree preferably from 0.2 to 50 gPO/g cat, more preferably from 0.4 to 30 gPO/g cat, even more preferably 0.5 to 20 gPO/g cat, still more preferably 0.5 to 10 gPO/g cat.

In another embodiment, the propylene polymer has i) a bulk density of at least 380 kg/m$^3$, preferably in the range from 400 to 600 kg/m$^3$, more preferably in the range of 400 to 520 kg/m$^3$, measured on the propylene polymer obtained in step e).

Furthermore, especially in case a propylene homopolymer or propylene random copolymer is produced, the xylene cold soluble fraction (XCS) determined according to ISO 16152 (25° C.) of the propylene polymer is preferably below 5.5 wt.-%, preferably below 4.5 wt.-%, more preferably below 4.0 wt.-%, especially below 3.0 wt.-% (measured from polymer after mixing, i.e. from pellets).

The solid Ziegler-Natta catalyst component of step a) thus comprises
- (a1) a compound of a transition metal (TM), which transition metal is selected from one of the groups 4 to 6 of the periodic table (IUPAC), preferably a titanium compound, more preferably $TiCl_4$,
- (a2) a compound of a metal (M) which metal is selected from one of the groups 1 to 3 of the periodic table (IUPAC), preferably a metal of group 2 of the periodic table (IUPAC), more preferably a magnesium compound, and
- (a3) an internal donor (ID) being a non-phthalic compound, wherein the internal donor (ID) is selected from optionally substituted malonates, maleates, succinates, glutarates, citraconates and derivatives and/or mixtures thereof.

The internal donor (ID) is selected from optionally substituted malonates, maleates, succinates, glutarates, citraconates and derivatives and mixtures thereof, preferably from citraconates and substituted maleates, most preferably the internal donor (ID) is citraconate.

Further, the solid catalyst is free of any external support material, like silica, alumina or separately prepared $MgCl_2$ based solid support, onto which active catalyst component are loaded. Instead, a solid catalyst is prepared by a method where all active catalyst compounds are contacted and/or reacted in liquid with each other, and after that the solid catalyst is formed. The solid catalyst particles are thus prepared via emulsion-solidification or via precipitation method.

According to the present invention, a prepolymerized solid Ziegler-Natta catalyst is provided, the catalyst comprising a solid Ziegler-Natta catalyst component comprising
- (a1) a compound of a transition metal (TM), which transition metal is selected from one of the groups 4 to 6 of the periodic table (IUPAC), preferably a titanium compound,
- (a2) a compound of a metal (M) which metal is selected from one of the groups 1 to 3 of the periodic table (IUPAC), preferably a metal of group 2 of the periodic table (IUPAC), more preferably a magnesium compound, and
- (a3) an internal donor (ID) being a non-phthalic compound, wherein the internal donor (ID) is selected from optionally substituted malonates, maleates, succinates, glutarates, citraconates and derivatives and/or mixtures thereof;

and the solid Ziegler-Natta catalyst component being prepolymerized with one or more olefin monomer(s) selected from C2, C3 or linear C4 olefin monomers and mixtures thereof, wherein the prepolymerized solid Ziegler-Natta catalyst
  i) has a prepolymerization degree from 0.2 to 50 gPO/g cat, preferably 0.4 to 30 gPO/g cat, more preferably 0.5 to 20 gPO/g cat, still more preferably 0.5 to 10 gPO/g cat,
  ii) is free of phthalic compounds, and
  iii) is free of an external support material.

According to the present invention, (i) the internal donor (ID) is selected from optionally substituted malonates, maleates, succinates, glutarates, citraconates and derivatives and/or mixtures thereof, preferably the internal donor (ID) is a citraconate, and (ii) the amount of Ti is from 1 to 6 wt.-%, Mg is from 10 to 20 wt.-% and internal donor (ID) is from 5 to 40 wt.-% of the catalyst composition.

The solid Ziegler-Natta catalyst component to be batch mode prepolymerized according to the present invention may still further be defined by the way as obtained.

Accordingly, the solid Ziegler-Natta catalyst component is preferably obtained by a process comprising the steps of
i)
  i$_1$) providing a solution of at least a Group 1 to 3 metal alkoxy compound, being the reaction product of a Group 1 to 3 metal compound (M) and an alcohol (A) comprising in addition to the hydroxyl moiety at least one ether moiety optionally in an organic liquid reaction medium, preferably a solution of at least a Group 2 metal alkoxy compound (Ax), being the reaction product of a Group 2 metal compound (M) and an alcohol (A) comprising in addition to the hydroxyl moiety at least one ether moiety optionally in an organic liquid reaction medium;
  or
  i$_2$) providing a solution of at least a Group 1 to 3 metal alkoxy compound (Ax') being the reaction product of a Group 1 to 3 metal compound (M) and an alcohol mixture of the alcohol (A) and a monohydric alcohol (B) of formula ROH, optionally in an organic liquid reaction medium, preferably a solution of at least a Group 2 metal alkoxy compound (Ax') being the reaction product of a Group 2 metal compound (M) and an alcohol mixture of the alcohol (A) and a monohydric alcohol (B) of formula ROH, optionally in an organic liquid reaction medium;
  or
  i$_3$) providing a solution of a mixture of the Group 1 to 3 alkoxy compound (Ax) and a Group 1 to 3 metal alkoxy compound (Bx) being the reaction product of a Group 1 to 3 metal compound (M) and the monohydric alcohol (B), optionally in an organic liquid reaction medium, preferably a solution of a mixture of the Group 2 alkoxy compound (Ax) and a Group 2 metal alkoxy compound (Bx) being the reaction product of a Group 2 metal compound (M) and the monohydric alcohol (B), optionally in an organic liquid reaction medium; and ii) adding said solution from step i) to at least one compound of a transition metal of Group 4 to 6 (TM) and
iii) obtaining the solid catalyst component particles,
and adding a non-phthalic internal electron donor (ID) as defined above at any step prior to step iii).

The internal donor (ID) or precursor thereof is preferably added to the solution of step i) or to the solution of a transition metal compound before step ii) or after completing step ii). Thus, it is essential that catalyst compounds are contacted in solution form before the solid particles are formed.

According to the procedure above, the solid Ziegler-Natta catalyst component can be obtained via precipitation method or via emulsion (liquid/liquid two-phase system)-solidification method depending on the physical conditions, especially temperature used in steps ii) and iii). Thus, the solid Ziegler-Natta catalyst component is prepared without adding any external carrier or support material to the catalyst synthesis. In both methods (precipitation or emulsion-solidification) the catalyst chemistry is the same.

In precipitation method combination of the solution of step i) with at least one transition metal compound (TM) in step ii) is carried out and the whole reaction mixture is kept at least at 50° C., more preferably in the temperature range of 55 to 110° C., more preferably in the range of 70 to 100° C., to secure full precipitation of the catalyst component in form of a solid particles (step iii).

In emulsion-solidification method in step ii) the solution of step i) is typically added to the at least one transition metal compound (TM) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step iii) of the droplets is suitably carried out by heating the emulsion to a temperature of 70 to 150° C., preferably to 80 to 110° C.

The catalyst component prepared by the emulsion-solidification method is preferably used in the present invention.

In a preferred embodiment, in step i) the solution of $i_2$) or $i_3$) are used, i.e. a solution of (Ax') or a solution of a mixture of (Ax) and (Bx).

Preferably the Group 2 metal (M) is magnesium.

The magnesium alkoxy compounds (Ax), (Ax') and (Bx) can be prepared in situ in the first step of the catalyst preparation process, step i), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a linear, cyclic or branched $C_2$ to $C_{10}$ hydrocarbon residue, and m is an integer of 2 to 6.

The magnesium alkoxy compounds of step i) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic linear, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt.-% solution in a solvent as indicated above. Typical commercially available Mg compound, especially dialkyl magnesium solutions are 20-40 wt.-% solutions in toluene or heptanes.

The reaction for the preparation of the magnesium alkoxy compound may be carried out at a temperature of 40° C. to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from citraconates and substituted maleates. Most preferably the internal donor is citraconate.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least three times, more preferably at least five times with aromatic and/or aliphatic hydrocarbons, preferably with toluene, heptane or pentane and/or with $TiCl_4$ or mixtures thereof. Washing solutions may also contain donors and/or compounds of Group 13, like trialkyl aluminium, halogenated alkyl aluminium compounds, alkyl alkoxy aluminium compounds or halogenated alkyl alkoxy aluminium compounds. Aluminium compounds can also be added during the catalyst synthesis.

The catalyst can further be dried, e.g. by evaporation or flushing with nitrogen, or it can be slurried to an oily liquid without any drying step.

The solid catalyst component prepared by emulsion-solidification method is in the form of spherical particles with a low surface area. Further, these catalysts particles may be featured by a uniform distribution of catalytically active sites thorough the catalyst particles.

The solid Ziegler-Natta catalyst component is typically in the form of particles having generally an average particle size range of 5 to 200 μm, preferably 10 to 100. Particles have surface area below 20 $m^2/g$, more preferably below 10 $m^2/g$, or even below 5 $m^2/g$. Typically the amount of Ti is from 1 to 6 wt.-%, Mg is from 10 to 20 wt.-% and internal donor (ID) is from 5 to 40 wt.-% of the catalyst composition.

Detailed description of the preparation of catalysts is disclosed in WO 2012/007430, EP 2 415 790, EP 2 610 270, EP 2 610 271 and EP 2 610 272 which are incorporated herein by reference.

According to step b) of the present process, the solid Ziegler-Natta catalyst component of step a) is subjected into a catalyst batch-mode or off-line prepolymerization step, wherein the solid Ziegler-Natta catalyst component is prepolymerized in the presence of one or more olefin monomer(s) selected from C2, C3 or linear C4 olefin monomers and mixtures thereof to obtain the prepolymerized solid Ziegler-Natta catalyst.

It is a finding of the present invention that the solid Ziegler-Natta catalyst component must be prepolymerized in the presence of one or more olefin monomer(s) selected from C2, C3 and linear C4 olefin monomers, and mixtures thereof to obtain the prepolymerized solid Ziegler-Natta catalyst.

Catalyst batch mode prepolymerization means that prepolymerization is conducted in a separate prepolymerization vessel, or may be conducted in a catalyst feed vessel with long enough residence time to achieve the desired polymerization degree.

The expression "one or more" olefin monomer(s) means that one or two or three different olefin monomer(s) as defined above may be used in process step b).

According to a preferred embodiment, only one olefin monomer selected from C2, C3 or linear C4 olefin monomers is used in step b).

According to one preferred embodiment of the present invention, the one olefin monomer(s) is selected from C2 and C3 olefin monomers.

In one embodiment, it is preferred that the weight ratio of the one or more olefin monomer(s) to the solid Ziegler-Natta catalyst component (olefin monomer/solid Ziegler-Natta catalyst component) in step b) is in the range of 0.2 to 50. Preferably, the weight ratio of the one or more olefin monomer(s) to the solid Ziegler-Natta catalyst component (olefin monomer/solid Ziegler-Natta catalyst component) in step b) is in the range of 0.4 to 30, more preferably 1 to 20, still more preferably in the range of 1.0 to 10. Because the residence time in the batch mode prepolymerization step is long enough, the ratios of the fed monomers and catalyst component in the catalyst prepolymerization step correspond closely to the final prepolymerization degree values.

It is further preferred that the batch-mode prepolymerization step b) is carried out in the presence of a co-catalyst and optionally in the presence of an external electron donor.

It is appreciated that the catalyst prepolymerization step b) is preferably carried out in the presence of a co-catalyst (Co) being a compound of group 13 metal, more preferably an Al compound.

The co-catalyst (Co) is preferably an aluminium alkyl or aluminium alkyl halide compound, wherein alkyl groups typically contain 1 to 20 C-atoms, e.g. 1 to 10 C-atoms. The aluminium alkyl compound is preferably trialkyl aluminium such as trimethylaluminium, triethylaluminium, tri-isobutylaluminium or tri-n-octylaluminium or dialkylaluminium halide, alkyl aluminium dihalide or alkyl aluminium sesquihalide, such as diethylaluminium chloride, dimethylaluminium chloride, ethylaluminium dichloride or ethylaluminium sesquichloride. In one specific embodiment, the co-catalyst (Co) is triethylaluminium (TEAL).

As already mentioned above, as a further component in the instant prepolymerization step b) an external electron donor (ED) can be present. Suitable external electron donors (ED) known in the art include ethers, ketones, amines, alcohols, phenols, phosphines and silanes. Examples of these compounds are given, among others, in WO 95/32994, U.S. Pat. Nos. 4,107,414, 4,186,107, 4,226,963, 4,347,160, 4,382,019, 4,435,550, 4,465,782, 4,472,524, 4,473,660, 4,522,930, 4,530,912, 4,532,313, 4,560,671 and 4,657,882.

Electron donors consisting of organosilane compounds, containing Si—OCOR, Si—OR, and/or Si—NR$_2$ bonds, having silicon as the central atom, and R is an alkyl, alkenyl, aryl, arylalkyl or cycloalkyl with 1-20 carbon atoms are known in the art. Such compounds are described e.g. in U.S. Pat. Nos. 4,472,524, 4,522,930, 4,560,671, 4,581,342, 4,657,882, EP 45976, EP 45977 and EP1538167.

It is especially preferred to use silanes selected from compounds of the general formula

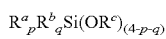

wherein $R^a$, $R^b$ and $R^c$ denote a hydrocarbyl radical, in particular an alkyl or cycloalkyl group, and wherein p and q are numbers ranging from 0 to 3 with the sum p+q being equal to or less than 3. $R^a$, $R^b$ and $R^c$ can be chosen independently from one another and are linear, branched or cyclic hydrocarbyl groups having 1 to 12 carbon atoms, preferably $R^a$, $R^b$ and $R^c$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, or is selected from silanes of general formula

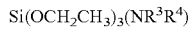

wherein $R^3$ and $R^4$ can be the same or different a represent a linear, branched or cyclic hydrocarbon group having 1 to 12 carbon atoms, preferably $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

Most preferably, as external electron donors (ED) are used silanes selected from (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$.

Preferably, the molar ratio of the external electron donor (ED) to the compound of a transition metal (TM) [ED:TM] is from 0 to 5, preferably from 0.5 to 3 in the batch-mode prepolymerization step.

Additionally or alternatively, the molar ratio of the co-catalyst (Co) to the compound of a transition metal (TM) [Co/TM] is in the range of 0.5 to 10, preferably in the range of 1 to 5.

In one embodiment, the molar ratio of the external electron donor (ED) to the compound of a transition metal (TM) [ED:TM] is from 0 to 5, preferably from 0.5 to 3, and the molar ratio of the co-catalyst (Co) to the compound of a transition metal (TM) [Co/TM] is in the range of 0.5 to 10, preferably in the range of 1 to 5.

Prepolymerization step b) is preferably conducted off-line in a medium in a separate prepolymerization vessel. It may also be conducted in a catalyst feed vessel. The medium is preferably an oil or a hydrocarbon solvent. Prepolymerization in catalyst feed vessel is suitable conducted in oil.

Alternatively, the medium is a hydrocarbon solvent. The hydrocarbon solvent to be employed in prepolymerization step b) may be selected among aromatic and aliphatic linear, branched and cyclic hydrocarbons with 5 to 20 carbon atoms, more preferably 5 to 12 carbon atoms, or mixtures thereof. Suitable hydrocarbon solvents include benzene, toluene, cumene, xylene, pentane, hexane, heptane, octane and nonane. Pentanes, hexanes and heptanes are preferred, and particularly preferred is pentane.

In one embodiment, prepolymerization step b) is carried out under an inert gas atmosphere as known and typically used in the polymerization of polymers. For example, prepolymerization step b) is carried out under nitrogen atmosphere.

The prepolymerization step b) is carried out at a temperature ranging from 2 to 40° C., preferably from 10 to 35° C. and most preferably from 12 to 25° C.

The prepolymerization degree of the prepolymerized solid catalyst obtained from step b) is from 0.2 to 50 gPO/g cat, preferably, from 0.4 to 30 gPO/g cat, more preferably from 0.5 to 20 gPO/g cat, still more preferably from 0.5 to 10 gPO/g cat.

As already mentioned above, the prepolymerized solid Ziegler-Natta catalyst is advantageously used for producing a propylene polymer resulting in a propylene polymer having improved powder morphology.

Thus, the present invention refers in another aspect to a process for producing a propylene polymer. The process comprises the steps of:
c) providing a prepolymerized solid Ziegler-Natta catalyst as defined herein,
d) subjecting the prepolymerized solid Ziegler-Natta catalyst of step c) into a polymerization reactor, where propylene and optionally at least one other α-olefin selected from C2 and/or C4 to C8 α-olefin is/are polymerized in the presence of the prepolymerized solid Ziegler-Natta catalyst,
e) obtaining a propylene polymer from step d) being free of phthalic compounds originating from the catalyst.

With regard to the prepolymerized solid Ziegler-Natta catalyst as defined above, and preferred embodiments thereof, it is referred to the definitions set out above when defining the process for producing a prepolymerized solid Ziegler-Natta catalyst in batch mode and its single steps and the prepolymerized solid Ziegler-Natta catalyst.

According to step d) of the present process, propylene and optionally at least one other α-olefin selected from C2 and/or C4 to C8 α-olefin is/are polymerized in the presence of the prepolymerized solid Ziegler-Natta catalyst.

That is to say, in polymerization step d) a propylene homopolymer (H-PP) or a propylene copolymer (R-PP) can be produced. Thus, the equipment used for polymerization step d) can comprise any polymerization reactors of conventional design for producing propylene homo- or copolymers.

In view of this, the polymerization step d) is conducted in one or more polymerization reactor(s). Preferably, the polymerization reactor system can comprise one or more conventional stirred-tank slurry reactors, or one or more gas phase reactors or combinations thereof.

For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt.-% monomer. According to a preferred embodiment the slurry reactor comprises a loop reactor. By "gas phase reactor" is meant any mechanically mixed or fluid bed reactor. Preferably the gas phase reactor comprises a mechanically agitated fluid bed reactor with gas velocities of at least 0.2 msec.

In one embodiment, the polymerization step d) is conducted in at least one gas phase reactor, preferably in one gas phase reactor.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate, which will make the particles act as a fluid. The fluidizing gas can contain also inert carrier gases, like nitrogen and also hydrogen as a polymer molecular weight controlling agent. The fluidized gas phase reactor can be equipped with a mechanical mixer.

The gas phase reactor used can be operated in the temperature range of 50 to 100° C., preferably between 65 and 90° C. and the reaction pressure between 10 and 40 bar and the partial pressure of monomer between 15 and 30 bar.

The temperature in the polymerization in the loop reactor is typically from 50 to 110° C., preferably from 60 to 100° C. and in particular from 65 to 95° C. The pressure is from 1 to 150 bar, preferably from 10 to 100 bar.

In another embodiment, the polymerization step d) is conducted in at least two polymerization reactors selected from a slurry-loop and gas phase reactors and combinations thereof. This embodiment is particularly suitable for producing multi(bi)modal polypropylene. It is possible to use several reactors of each type, e.g. one loop reactor and two or three gas phase reactors in series.

A preferred embodiment of the invention comprises carrying out the polymerization step d) in a process comprising loop and gas phase reactors in a cascade where the loop reactor operates in liquid propylene.

It is possible to have a flash between loop and gas phase reactors.

In addition to the actual polymerization reactors used for producing the propylene homo- or copolymer, the polymerization reaction system can also include a number of additional reactors, such as pre- and/or postreactors, as typically used and being well known in the art.

If a process prepolymerization step precedes the actual first polymerization step the batch mode prepolymerized catalyst is fed to the process prepolymerization step.

Typically such a process prepolymerization is conducted in a prepolymerization reactor, typically in a slurry reactor, e.g. a loop reactor.

It is appreciated that the term "propylene polymer" encompasses propylene homopolymers (H-PP) and/or propylene copolymers (C-PP).

Moreover, the term "propylene copolymer" encompasses propylene random copolymers, heterophasic polymers and mixtures thereof.

In a preferred embodiment, the prepolymerized solid Ziegler-Natta catalyst according to the present invention is used for producing a propylene homopolymer or a propylene random copolymer. In another embodiment, the prepolymerized solid Ziegler-Natta catalyst is used for producing a propylene homopolymer. Furthermore, the propylene homopolymer or propylene random copolymer may have an amount of xylene cold soluble fraction (XCS) determined according to ISO 16152 (25° C.) of below 5.5 wt.-%, preferably below 4.5 wt.-%, more preferably below 4.0 wt.-%, especially below 3.0 wt.-% (measured from polymer after mixing, i.e. from pellets).

As known for the skilled person, a random propylene copolymer is different from heterophasic polypropylene which is a propylene copolymer comprising a propylene homo or random copolymer matrix component (1) and an elastomeric copolymer component (2) of propylene with one or more of ethylene and/or $C_4$-$C_8$ alpha-olefin copolymers, wherein the elastomeric (amorphous) copolymer component (2) is dispersed in said propylene homo or random copolymer matrix polymer (1).

In one specific embodiment, the propylene polymer prepared in process step d) is a propylene homopolymer (H-PP).

The expression propylene homopolymer (H-PP) as used throughout the instant invention relates to a propylene polymer that consists substantially, i.e. of more than 99.5 wt.-%, still more preferably of at least 99.7 wt.-%, like of at least 99.8 wt.-%, of propylene units. In a preferred embodiment only propylene units in the propylene homopolymer (H-PP) are detectable.

Additionally or alternatively, the propylene polymer is a propylene copolymer (C-PP).

In one embodiment, it is possible that the propylene homo- or copolymer produced in step d) is further polymerized in the presence of ethylene and optionally a $C_4$ to $C_8$ α-olefin, obtaining thereby an elastomeric propylene copolymer (E) such as to obtain a heterophasic propylene copolymer.

One advantage of the implementation of the prepolymerized solid Ziegler-Natta catalyst in the process for producing a propylene polymer is that the propylene polymer obtained has improved powder morphology (compared to a propylene polymer prepared with the same solid Ziegler-Natta catalyst without batch-mode prepolymerization).

Due to the absence of phthalic compounds in the solid Ziegler-Natta catalyst component and batch-mode prepolymerized version thereof used in the process for producing a propylene polymer, the propylene polymer obtained from step d) is free of phthalic compounds originating from the catalyst.

Furthermore, the propylene polymer obtained in step e) preferably has a bulk density of at least 380 kg/m³, measured on the propylene polymer obtained in step e). For example, the propylene polymer preferably has a bulk density in the range from 400 to 600 kg/m³, preferably in the range from 400 to 550 kg/m³, more preferably in the range of 400 to 520 kg/m³, measured on the propylene polymer obtained in step e).

The propylene polymer obtained in step e) may have a melt flow rate $MFR_2$ (230° C., 2.16 kg) measured according to ISO 1133 within a broad range, like 0.15 to 1 000 g/10 min depending on the desired properties of the end applications.

The propylene polymer obtained by the process for producing a propylene polymer can be pelletized and compounded using any of the variety of compounding and blending methods well known and commonly used in the resin compounding art.

In view of the good results obtained, the present invention is also directed to the prepolymerized solid Ziegler-Natta catalyst obtained by the process for producing a prepolymerized solid Ziegler-Natta catalyst in batch mode as defined herein.

With regard to the prepolymerized solid Ziegler-Natta catalyst and preferred embodiments thereof, it is referred to the definitions set out above when defining the process for producing a prepolymerized solid Ziegler-Natta catalyst in batch mode and the prepolymerized solid Ziegler-Natta catalyst.

The present invention is further directed to the use of a prepolymerized solid Ziegler-Natta catalyst as defined herein in a process for producing a propylene polymer.

With regard to the prepolymerized solid Ziegler-Natta catalyst, the process for producing a propylene polymer and preferred embodiments thereof, it is referred to the definitions set out above when defining the process for producing a prepolymerized solid Ziegler-Natta catalyst in batch mode, the process for producing a propylene polymer and their single steps as well as the prepolymerized solid Ziegler-Natta catalyst.

In the following the present invention is further illustrated by means of examples.

EXAMPLES

1. Measuring Methods

The following definitions of terms and determination methods apply for the above general description of the invention as well as to the below examples unless otherwise defined.

$MFR_2$ (230° C./2.16 kg) is measured according to ISO 1133 at 230° C. and 2.16 kg load.

Intrinsic viscosity was measured according to DIN ISO 1628/1, October 1999 (in Decalin at 135° C.).

Bulk density was measured according to ASTM D1895.

Average particle size was measured according to ISO 13322-2 using Image analysis methods using a Camsizer P4 analyser.

Xylene cold solubles (XCS, wt.-%) was determined at 25° C. according to ISO 16152; first edition; 2005-07-01. The part which remains insoluble is the xylene cold insoluble (XCI) fraction.

DSC analysis, melting temperature (Tm) and melting enthalpy (Hm), crystallization temperature (Tc) and crystallization enthalpy (Hc) was measured with a TA Instrument Q200 differential scanning calorimetry (DSC) on 5 to 7 mg samples. DSC was run according to ISO 11357/part 3/method C2 in a heat/cool/heat cycle with a scan rate of 10° C./min in the temperature range of −30 to +225° C. Crystallization temperature and crystallization enthalpy (Hc) were determined from the cooling step, while melting temperature and melting enthalpy (Hm) were determined from the second heating step.

2. Examples

Reference Catalyst Component (CE1)

Preparation of the Solid Ziegler-Natta Catalyst Component

Used Chemicals:

TiCl$_4$ (CAS 7550-45-90) was supplied by commercial source.

20% solution in toluene of butyl ethyl magnesium (Mg (Bu)(Et)), provided by Crompton 2-ethylhexanol, provided by Merck Chemicals 3-Butoxy-2-propanol, provided by Sigma-Aldrich bis(2-ethylhexyl)citraconate, provided by Contract Chemicals Viscoplex® 1-254, provided by Evonik Heptane, provided by Chevron Preparation of Mg Complex 3.4 litre of 2-ethylhexanol and 810 ml of propylene glycol butyl monoether (in a molar ratio 4/1) were added to a 20 l reactor. Then, 7.8 litre of a 20% solution in toluene of BEM (butyl ethyl magnesium) provided by Crompton GmbH was slowly added to the well stirred alcohol mixture. During the addition the temperature was kept at 10° C. After addition the temperature of the reaction mixture was raised to 60° C. and mixing was continued at this temperature for 30 minutes. Finally, after cooling to room temperature the obtained Mg-alkoxide was transferred to storage vessel.

21,2 g of Mg alkoxide prepared above was mixed with 4,0 ml bis(2-ethylhexyl) citraconate for 5 min. After mixing the obtained Mg complex was used immediately in the preparation of catalyst component.

Preparation of the Solid Catalyst Component 19.5 ml titanium tetrachloride was placed in a 300 ml reactor equipped with a mechanical stirrer at 25° C. Mixing speed was adjusted to 170 rpm. 26.0 of Mg-complex prepared above was added within 30 minutes keeping the temperature at 25° C. 3.0 ml of Viscoplex 1-254 and 24.0 ml of heptane were added to form an emulsion. Mixing was continued for 30 minutes at 25° C. Then, the reactor temperature was raised to 90° C. within 30 minutes. The reaction mixture was stirred for further 30 minutes at 90° C. Afterwards, stirring was stopped and the reaction mixture was allowed to settle for 15 minutes at 90° C.

The solid material was washed with 100 ml of toluene, with of 30 ml of TiCl4, with 100 ml of toluene and two times with 60 ml of heptane. 1 ml of donor was added to the two first washings. Washings were made at 80° C. under stirring 30 min with 170 rpm. After stirring was stopped, the reaction mixture was allowed to settle for 20-30 minutes and followed by siphoning.

Afterwards stirring was stopped and the reaction mixture was allowed to settle for 10 minutes decreasing the temperature to 70° C. with subsequent siphoning, and followed by N$_2$ sparging for 20 minutes to yield an air sensitive powder.

Catalyst has a surface area measured by BET method below 5 m$^2$/g, i.e. below the detection limit. Ti content was 2.6 wt.-%.

Off-Line (Batch-Mode) Prepolymerization of the Solid Catalyst Component

Inventive Examples (IE1 and IE2)

The catalyst component of Reference example (CE1) was off-line prepolymerized with propene in oil, which is a medical-grade, hydrogenated mineral white oil under conditions as indicated in Table 1 (IE1 and IE2).

As external donor (ED) was used (cyclopentyl)$_2$Si (OCH$_3$)$_2$ and as cocatalyst was used triethyl aluminium (TEAL).

Further, propylene was polymerized using the catalyst component of Reference example (CE1) and off-line prepolymerized catalysts of inventive examples IE1 and IE2.

The polymerization was carried out for 1 h at 80° C.

As external donor (ED) was used (cyclopentyl)$_2$Si (OCH$_3$)$_2$ and as cocatalyst was used triethyl aluminium (TEAL). Al/Ti ratio was 250 mol/mol and Al/ED ratio was 10 mol/mol, H$_2$ feed was 200 mmol in the polymerization.

Polymerization results are disclosed in Table 2. (PCE1 (comparative) and PIE1 and PIE2 (inventive examples)

TABLE 1

Batch-mode (or off-line) prepolymerization of the solid catalyst component

|  |  | IE1 | IE2 |
|---|---|---|---|
| Off-line prepolymerization |  | yes | Yes |
| Catalyst oil slurry | g | 19.6 | 19.6 |
| Amount of dry Catalyst in slurry | g | 5.2 | 5.2 |
| TEAL | ml | 1.0 | 1.0 |
| Al/Ti | mol/mol | 2.5 | 2.5 |
| ED | ml | 0.60 | 0.60 |
| ED/Ti | mol/mol | 0.90 | 0.90 |
| Additional oil | ml | 20 | 20 |
| Reaction T | ° C. | 18 | 18 |
| Pressure | bar | 5 | 5 |
| C3 feed | g | 9 | 11.5 |
| Reaction time | h | 5 | 6 |
| DP (prepolymerization degree) | gPP/gcat | 0.6 | 1.1 |
| Final cat concentration | wt.-% | 12.7 | 12.0 |

TABLE 2

Propylene polymerization

|  |  | PCE1 | PIE1 | PIE2 |
|---|---|---|---|---|
| Off-line Prepolymerization cat | mg | — | 162 | 171 |
| Catalyst amount, as dry catalyst | mg | 20.5 | 20.6 | 20.6 |
| Activity | kgPP/gcat h | 21.3 | 19.8 | 20 |
| MFR2 | g/10 min | 13.1 | 13.1 | 13.5 |
| BD | kg/m$^3$ | 419 | 458 | 426 |

The powder morphology of the propylene polymers produced by using the inventive prepolymerized solid Ziegler-Natta catalyst is improved compared to the propylene polymer produced by using a Ziegler-Natta catalyst without off-line prepolymerization. In particular, the prepolymerized solid Ziegler-Natta catalyst resulted in less broken up particles and more spherical particles. This is indicated by the increase in BD which was achieved with the prepolymerized solid Ziegler-Natta catalyst.

Off-Line Prepolymerization of the Solid Catalyst Component

Inventive Examples (IE3 to IE6)

The catalyst component of Reference example (CE1) was off-line prepolymerized in heptane with ethylene or propylene under conditions as indicated in Table 3.

As external donor (ED) in IE3 and IE4, was used (cyclopentyl)$_2$Si(OCH$_3$)$_2$ was used, in IE5 and IE6 no ED was used. As cocatalyst, triethyl aluminium (TEAL) was used.

Polymerization

Further, propylene was polymerized using the off-line prepolymerized catalysts of inventive examples IE3 to IE6 (PIE3 to PIE6).

The polymerization was carried out for 1 h at 80° C.

As external donor (ED), (cyclopentyl)$_2$Si(OCH$_3$)$_2$ was used and as cocatalyst triethyl aluminium (TEAL) was used. Al/Ti ratio was 250 mol/mol and Al/ED ratio was 10 mol/mol, H$_2$ feed was 200 mmol.

Polymerization results (PIE3 to PIE6) are disclosed in Table 4

TABLE 3

Batch-mode (or off-line) prepolymerization of the solid catalyst component

| Off-line prepolymerization | | IE3 | IE4 | IE5 | IE6 |
|---|---|---|---|---|---|
| monomer | | C3 | C3 | C2 | C2 |
| Amount of Catalyst as dry cat | g | 4.0 | 4.0 | 2.0 | 2.0 |
| TEAL | ml | 1.0 | 1.0 | 0.3 | 0.3 |
| Al/Ti | mol/mol | 3 | 3 | 2 | 2 |
| ED (D-donor) | ml | 0.56 | 0.56 | — | — |
| ED/Ti | mol/mol | 1 | 1 | — | — |
| Cat conc in start | wt.-% | 12.0 | 12.0 | 6.6 | 6.9 |
| Reaction T | ° C. | 16 | 12 | 5 | 5 |
| Pressure | bar | 0.5 | 0.5 | 0.5 | 0.5 |
| Reaction time | h | 1 | 3.3 | 2.1 | 4.7 |
| DP | gPP/gcat | 1.0 | 1.8 | 1.2 | 2.4 |
| Final cat concentration. | wt.-% | 51 | 36 | 44 | 29 |

TABLE 4

Polymerization results

| | | PIE3 | PIE4 | PIE5 | PIE6 |
|---|---|---|---|---|---|
| Off-line Prepolymerization cat | mg | 30 | 45 | 34 | 52 |
| Amount of Catalyst as dry cat | mg | 15.4 | 16.1 | 15.0 | 15.4 |
| Activity | kgPP/gcath | 20.2 | 22.8 | 23.4 | 26.8 |
| MFR | g/10 min | 12.6 | 11.9 | 16.3 | 17.0 |
| BD | kg/m$^3$ | 460 | 450 | 460 | 450 |

The powder morphology of the propylene polymers produced by using the inventive prepolymerized solid Ziegler-Natta catalyst is improved compared to the propylene polymer produced by using a Ziegler-Natta catalyst without off-line prepolymerization. In particular, the prepolymerized solid Ziegler-Natta catalyst resulted in an increased bulk density.

Off-Line Prepolymerization in a Catalyst Feed Vessel

Inventive Examples (IE7 and IE8)

The catalyst component of Reference example (CE1) was off-line prepolymerized in oil with 1-butene under conditions as indicated in Table 5.

As external donor (ED) in IE7, (cyclopentyl)$_2$Si(OCH$_3$)$_2$ was used, in IE8 no ED was used. As cocatalyst, triethyl aluminium (TEAL) was used.

In comparative example CE2, the prepolymerization was done with 1-hexene.

Further, propylene was polymerized in a multistage process (process prepolymerization, slurry-loop reactor, gas phase reactor) using the catalyst component of Reference example (CE1) (PGE2) and off-line prepolymerized catalysts of inventive examples IE7 and IE8 (IE7 and PIE8), and of comparative example CE2 (PCE3). Polymerization conditions and Results are in Table 6.

TABLE 5

Batch-mode (or off-line) prepolymerization of the solid catalyst component

| | | CE1 | IE7 | CE2 | IE8 |
|---|---|---|---|---|---|
| Off-line prepolymerization | | no | yes | Yes | Yes |
| monomer | | | 1-butene | 1-hexene | 1-butene |
| Amount of Catalyst as dry cat | g | | 150 | 150 | 150 |
| Catalyst concentration in oil-slurry | wt.-% | | 1 | 1 | 1 |
| Amount of 1-butene/hexene | g | | 150 | 150 (C6) | 150 |
| Al/Ti | mol/mol | | 1 | 1 | 1 |
| ED/Ti | mol/mol | | — | — | 1, 3 |
| Reaction T | ° C. | | 20 | 20 | 20 |
| pressure | bar | | 0.5 | 0.5 | 0.5 |
| Reaction time | h | | 2 | 2 | 2 |
| DP | gpolyC4/gcat | | 1 | | 2 |
| DP | gpolyC6/gcat | | — | 1 | — |

TABLE 6

Polymerization results

| | | PCE2 | PIE7 | PCE3 | PIE8 |
|---|---|---|---|---|---|
| Process prepolymerization reactor | | | | | |
| Temperature | ° C. | 30 | 30 | 30 | 30 |
| pressure | MPa | 5.3 | 5.4 | 5.4 | 5.4 |
| Cat feed | g/h | 1.6 | 1.7 | 1.5 | 2.3 |
| ED | g/t C3 | 15.9 | 15.6 | 15.0 | — |
| TEAL | g/t C3 | 170 | 150 | 150 | 150 |
| Al/ED | Mol/mol | 22 | 19 | 20 | — |
| H2 | g/h | 2.5 | 2.5 | 2.5 | 1.5 |
| Loop reactor | | | | | |
| Temperature | ° C. | 80 | 80 | 80 | 80 |
| pressure | MPa | 5.4 | 5.4 | 5.4 | 5.4 |
| C3 feed | Kg/h | 146 | 152 | 152 | 152 |
| H2/C3 feed | Mol/kmol | 0.9 | 0.9 | 0.9 | 0.5 |
| Residence time | h | 0.4 | 0.4 | 0.4 | 0.4 |
| split Polymer from loop | wt.-% | 61 | 66 | 68 | 65 |
| MFR2 | g/10 min | 7.7 | 7.4 | 7.5 | 6.9 |
| Fines | % | 0.3 | 1.7 | 10.8 | 5.1 |
| Bulk density | Kg/m$^3$ | 359 | 431 | 205 | 464 |
| Gas phase reactor (GPR) | | | | | |
| Temperature | ° C. | 80 | 80 | 80 | 80 |
| pressure | MPa | 2.6 | 2.6 | 2.6 | 2.6 |
| C3 feed | Kg/h | 192 | 201 | 200 | 198 |
| H2/C3 feed | Mol/kmol | 12 | 12 | 13 | 8,0 |
| Residence time | h | 2.9 | 2.7 | 3.3 | 2.6 |
| split Polymer from GPR | wt.-% | 39 | 34 | 32 | 35 |
| MFR2 | g/10 min | 9.6 | 6.9 | 7.8 | 9.6 |
| XCS | % | 2.2 | 2.0 | 1.7 | 4.2 |
| Bulk density | Kg/m$^3$ | 338 | 433 | 211 | 439 |
| Production rate (prepol + loop + GPR) Final polymer after mixing | Kg/h | 57 | 69 | 67 | 71 |

TABLE 6-continued

Polymerization results

|  |  | PCE2 | PIE7 | PCE3 | PIE8 |
|---|---|---|---|---|---|
| MFR2 | g/10 min | 8.0 | 6.7 | 7.3 | 9.8 |
| Total XCS | % | 2.5 | 2.6 | 1.6 | 3.8 |
| Bulk density | Kg/m$^3$ | 362 | 394 | 206 | 425 |
| APS | mm | 1, 0 | 0, 9 | 0, 5 | 0, 8 |
| Tm | ° C. | 165 | 165 | 166 | 164 |

Polymerizations were run smoothly, but in PCE3 bulk density collapsed totally and the propylene polymer obtained was dusty. Also in PCE2, the bulk density was clearly lower than in inventive examples PIE7 and PIE8.

The present invention is further supported by the following items:

1. A process for producing a prepolymerized solid Ziegler-Natta catalyst in batch mode, the process comprising the steps of:
   a) providing a solid Ziegler-Natta catalyst component being free of phthalic compounds, and
   b) subjecting the solid Ziegler-Natta catalyst component of step a) into a catalyst prepolymerization step, wherein the solid Ziegler-Natta catalyst component is prepolymerized in the presence of one or more olefin monomer(s) selected from C2, C3 or linear C4 olefin monomers and mixtures thereof to obtain the prepolymerized solid Ziegler-Natta catalyst.
2. The process according to item 1, wherein the solid Ziegler-Natta catalyst component of step a) comprises
   (a1) a compound of a transition metal (TM), which transition metal is selected from one of the groups 4 to 6 of the periodic table (IUPAC), preferably a titanium compound,
   (a2) a compound of a metal (M) which metal is selected from one of the groups 1 to 3 of the periodic table (IUPAC), preferably a metal of group 2 of the periodic table (IUPAC), more preferably a magnesium compound, and
   (a3) an internal donor (ID) being a non-phthalic compound, preferably a non-phthalic acid ester.
3. The process according to item 1 or 2, wherein the catalyst prepolymerization step b) is carried out in the presence of a co-catalyst and optionally in the presence of an external electron donor.
4. The process according to item 3, wherein the mol ratio of
   a) the external electron donor (ED) to the compound of a transition metal (TM) [ED:TM] is from 0 to 5 mol/mol, preferably from 0.5 to 3 mol/mol, and/or
   b) of the co-catalyst (Co) to the compound of a transition metal (TM) [Co:TM] is in the range from 0.5 to 10 mol/mol, preferably from 1 to 5 mol/mol.
5. The process according to any one of items 1 to 4, wherein the internal donor (ID) is selected from optionally substituted malonates, maleates, succinates, glutarates, cyclohexene-1,2-dicarboxylates, citraconates, benzoates and derivatives and/or mixtures thereof, preferably the internal donor (ID) is a citraconate.
6. The process according to item 1 to 5, wherein the olefin monomer in step b) is selected from C2 and C3 olefin monomers.
7. The process according to any one of item 1 to 6, wherein step b) is carried out
   i) off-line in a medium, preferably the medium is an oil or a hydrocarbon solvent, or
   ii) in a catalyst feed vessel in oil
8. The process according to any one of items 1 to 7, wherein the prepolymerization degree in step b) is from 0.2 to 50 gPO/g cat, preferably 0.4 to 30 gPO/g cat, more preferably 0.5 to 20 gPO/g cat, still more preferably 0.5 to 10 gPO/g cat.
9. The process according to any one of items 1 to 8, wherein the prepolymerized solid Ziegler-Natta catalyst is free of an external support material.
10. A prepolymerized solid Ziegler-Natta catalyst comprising a solid Ziegler-Natta catalyst component comprising
    (a1) a compound of a transition metal (TM), which transition metal is selected from one of the groups 4 to 6 of the periodic table (IUPAC), preferably a titanium compound,
    (a2) a compound of a metal (M) which metal is selected from one of the groups 1 to 3 of the periodic table (IUPAC), preferably a metal of group 2 of the periodic table (IUPAC), more preferably a magnesium compound, and
    (a3) an internal donor (ID) being a non-phthalic compound, preferably a non-phthalic acid ester
    and the solid Ziegler-Natta catalyst component being prepolymerized with one or more olefin monomer(s) selected from C2, C3 or linear C4 olefin monomers and mixtures thereof,
    wherein the prepolymerized solid Ziegler-Natta catalyst
    i) has a prepolymerization degree from 0.2 to 50 gPO/g cat, preferably 0.4 to 30 gPO/g cat, more preferably 0.5 to 20 gPO/g cat, still more preferably 0.5 to 10 gPO/g cat,
    ii) is free of phthalic compounds, and
    iii) is free of an external support material.
11. The prepolymerized solid Ziegler-Natta catalyst according to item 10, wherein
    i) the internal donor (ID) is selected from optionally substituted malonates, maleates, succinates, glutarates, cyclohexene-1,2-dicarboxylates, citraconates, benzoates and derivatives and/or mixtures thereof, preferably the internal donor (ID) is a citraconate, and
    ii) the amount of Ti is from 1 to 6 wt.-%, Mg is from 10 to 20 wt.-% and internal donor (ID) is from 5 to 40 wt.-% of the catalyst composition.
12. A process for producing a propylene polymer, the process comprising the steps of:
    c) providing a prepolymerized solid Ziegler-Natta catalyst obtained by a process as defined in any one of items 1 to 9 or the prepolymerized solid Ziegler-Natta catalyst of item 10 or 11,
    d) subjecting the prepolymerized solid Ziegler-Natta catalyst of step c) into a polymerization reactor, where propylene and optionally at least one other α-olefin selected from C2 and/or C4 to C8 α-olefin is/are polymerized in the presence of the prepolymerized solid Ziegler-Natta catalyst,
    e) obtaining a propylene polymer from step d) being free of phthalic compounds originating from the catalyst.
13. The process according to item 12, wherein step d) is carried out in one or more polymerization reactor(s).
14. The process according to item 12 or 13, wherein the propylene polymer has a bulk density of at least 380 kg/m$^3$, preferably in the range from 400 to 600 kg/m$^3$, more preferably in the range of 400 to 550 kg/m$^3$, measured on the propylene polymer obtained in step e).

15. A prepolymerized solid Ziegler-Natta catalyst obtained by a process as defined in any one of items 1 to 9.

16. Use of a prepolymerized solid Ziegler-Natta catalyst according to any one of items 10, 11 or 15 in a process for producing a propylene polymer.

The invention claimed is:

1. A process for producing a propylene polymer, the process comprising the steps of:
   I) producing in batch mode a prepolymerized Ziegler-Natta catalyst by
      a) providing a solid Ziegler-Natta catalyst component being free of phthalic compounds, wherein the solid Ziegler-Natta catalyst component comprises:
         (a1) a compound of a transition metal (TM), which transition metal is selected from one of the groups 4 to 6 of the periodic table (IUPAC),
         (a2) a compound of a metal (M) which metal is selected from one of the groups 1 to 3 of the periodic table (IUPAC), and
         (a3) an internal donor (ID) being a non-phthalic compound, wherein the internal donor (ID) is selected from optionally substituted malonates, maleates, succinates, glutarates, citraconates and derivatives and/or mixtures thereof; and
      b) subjecting the solid Ziegler-Natta catalyst component of step a) into a catalyst prepolymerization step, wherein the solid Ziegler-Natta catalyst component is prepolymerized in the presence of linear C4 olefin monomers to a polymerization degree from 0.2 to 50 gPO/g cat to obtain the prepolymerized solid Ziegler-Natta catalyst, and
   II) producing a propylene polymer by
      c) subjecting the prepolymerized Ziegler-Natta catalyst of step b) into a polymerization reactor, wherein propylene and optionally at least one other α-olefin selected from C2 and/or C4 to C8-α-olefin is/are polymerized in the presence of the prepolymerized solid Ziegler-Natta catalyst, wherein step c) comprises a process prepolymerization step and is carried out in a prepolymerization reactor and one or more polymerization reactor(s), and
      d) obtaining the propylene polymer from step c) being free of phthalic compounds originating from the catalyst, wherein the propylene polymer is a propylene homopolymer or a propylene random copolymer having an amount of xylene cold soluble fraction, determined according to ISO 16152 (25° C.), of below 5.5 wt. %.

2. The process according to claim 1, wherein the solid Ziegler-Natta catalyst component of step a) comprises:
   (a1) a titanium compound, and
   (a2) a metal of group 2 of the periodic table (IUPAC).

3. The process according to claim 1, wherein the catalyst prepolymerization step b) is carried out in the presence of a co-catalyst and optionally in the presence of an external electron donor.

4. The process according to claim 3, wherein the mol ratio of:
   a) the external electron donor (ED) to the compound of a transition metal (TM) [ED: TM] is from 0 to 5 mol/mol, and/or
   b) of the co-catalyst (Co) to the compound of a transition metal (TM) [Co: TM] is in the range from 0.5 to 10 mol/mol.

5. The process according to claim 1, wherein the internal donor (ID) is a citraconate.

6. The process according to claim 1, wherein step b) is carried out:
   i) off-line in a medium, or
   ii) in a catalyst feed vessel in oil.

7. The process according to claim 1, wherein the prepolymerization degree in step b) is from 0.4 to 30 gPO/g cat.

8. The process according to claim 1, wherein the prepolymerized solid Ziegler-Natta catalyst is free of an external support material.

9. The process according to claim 1, wherein the propylene polymer has a bulk density of at least 380 kg/m$^3$.

* * * * *